United States Patent [19]

Wells

[11] Patent Number: 4,825,192

[45] Date of Patent: Apr. 25, 1989

[54] RETRACTABLE GUARD FOR VEHICLES

[76] Inventor: Kenneth A. Wells, P.O. Box 26042, Beattles, Ak. 99726-26107

[21] Appl. No.: 124,576

[22] Filed: Nov. 24, 1987

[51] Int. Cl.$^4$ ............................................. E01F 9/00
[52] U.S. Cl. ....................................... 340/433; 116/32; 116/DIG. 15; 340/482; 340/472; 293/21; 293/22; 280/765.1; 280/766.1
[58] Field of Search ..................... 340/52 R, 24, 81 R, 340/81 F, 82, 83, 84, 87, 100, 102, 114 R B, 120, 127, 130–132, 114; 116/32, DIG. 15, 211; 280/500, 755, 762, 763.1, 764.1, 765.1, 766.1; 293/21–25; 180/281, 313

[56] References Cited

U.S. PATENT DOCUMENTS

| | | | |
|---|---|---|---|
| 1,146,355 | 7/1915 | Shilling | 116/50 |
| 1,231,531 | 6/1917 | Shilling | 280/755 |
| 1,761,994 | 8/1929 | Shilling | 280/762 |
| 2,646,016 | 7/1953 | Wilson | 116/32 |
| 3,236,552 | 2/1966 | Percifull | 116/28 R |
| 3,263,644 | 8/1966 | Irby | 116/32 |
| 3,447,826 | 11/1967 | Gostomski | 280/500 |
| 3,490,409 | 1/1970 | Pomeroy | 116/32 |
| 3,718,357 | 2/1973 | Hertzell | 293/9 |
| 3,729,221 | 4/1973 | Granig | 293/24 |
| 3,788,268 | 1/1974 | Hiatt et al. | 293/17 |
| 3,915,486 | 10/1975 | Maeda et al. | 293/1 |
| 4,221,410 | 9/1980 | Dawson | 293/21 |
| 4,489,306 | 12/1984 | Scolari | 340/90 |
| 4,559,518 | 12/1985 | Latta, Jr. | 340/130 |
| 4,565,152 | 1/1986 | Bennett | 116/50 |
| 4,766,413 | 8/1988 | Reavell | 340/130 |

FOREIGN PATENT DOCUMENTS

| | | | |
|---|---|---|---|
| 1028728 | 3/1978 | Canada | 280/762 |
| 0719977 | 11/1931 | France | 293/24 |

Primary Examiner—Joseph A. Orsino
Assistant Examiner—Jill D. Jackson
Attorney, Agent, or Firm—William D. Hall

[57] ABSTRACT

A protective guard is provided for a school bus. A series of telescoping members retracts along the front of the bus, and are in a compact form when the bus is moving. When the school bus stops two of the members telescope outwardly in series and extend across the lane of oncoming traffic. The members are so long and strong that any motorist attempting to pass the bus will damage his car. Flashing red lights are mounted on the extended members. The members are extended and retracted by a lead screw. The lead screw, when it extends the telescoping members, first drives the innermost member outwardly and away from the other movable member. The lead screw then engages the other movable member and drives it outwardly and it carries the innermost member to its ultimate extended position.

20 Claims, 3 Drawing Sheets

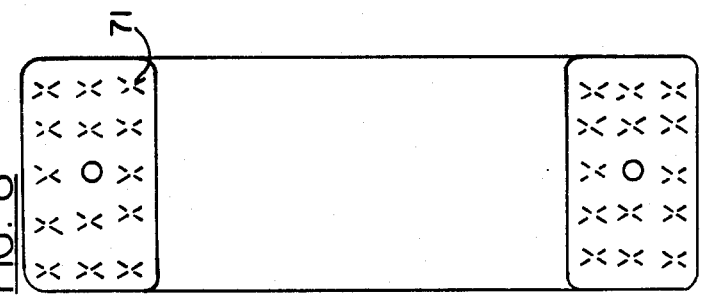
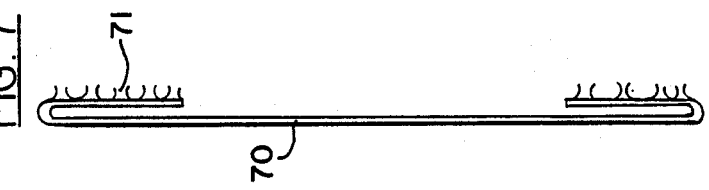
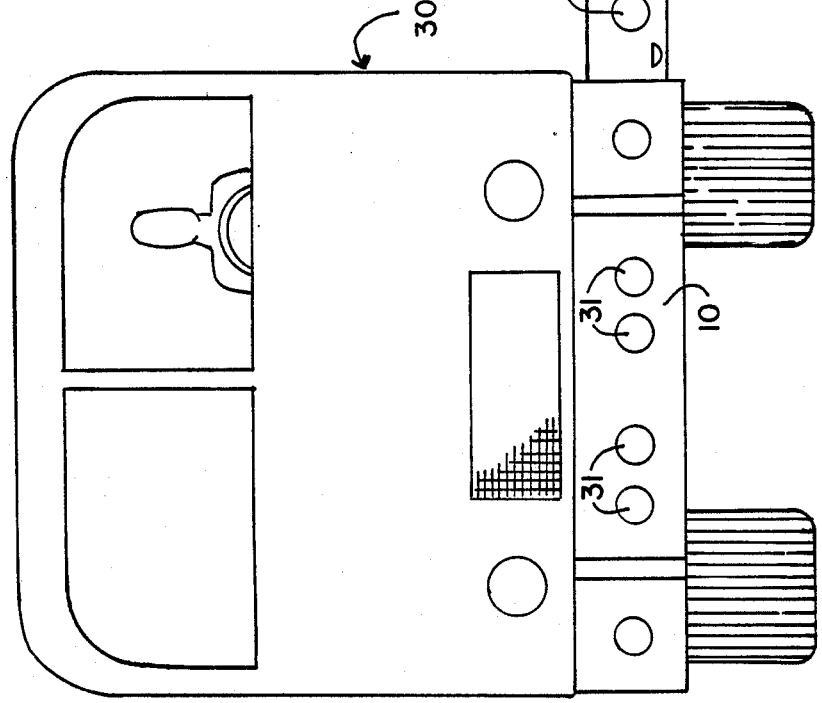

4,825,192

RETRACTABLE GUARD FOR VEHICLES

BACKGROUND OF THE INVENTION

For many years school busses have been provided with warning lights and other warning devices to stop traffic that may attempt to pass the bus in either direction.

U.S. Pat. No. 4,565,152, to Bennett shows an improvement upon the usual simple warning arrangements. Bennett employs a pivoted "stop sign" that swings out into view of oncoming traffic following which a flag is projected further outward (from the side of the bus) through a tube mounted on the stop sign when the latter is perpendicular to the side of the school bus. The flag and its support are not intended to provide a firm and strong barrier to oncoming traffic. Furthermore, the flag and its support would not substantially impair a driver intent on passing the bus. In another form, Bennett has a tube mounted horizontally across the front of the bus from which a rod may be extended outwardly to carry the flag and may later be retracted.

SUMMARY OF THE INVENTION

One object of this invention is to provide a substantial and strong guard that will project away from the bus into the lane along which traffic might attempt to pass the bus. The guard is equipped with red lights which intermittently flash when the guard is extended. The guard may be built heavy and strong enough that the driver of a car running through it would be damaged and would surely be obliged to stop and be arrested.

In its specific form the guard comprises a telescoping device having first, second and third sections. One section is mounted across the front, or rear, of the bus. The other two sections may be extended so that the three sections are in series with the two of them extending into the lane of traffic not occupied by the bus thus obstructing flow of traffic in either direction past the bus.

All three sections are on a common axis. A lead screw is also on that axis. When the lead screw rotates in one direction it drives one of said sections outwardly until that section engages another section which causes the lead screw to drive the latter section outwardly. Such outward motion of the latter section carries said one section with it until the three sections are in series across the portion of the highway not occupied by the bus.

The telescoping devices may incorporate means for applying paint and/or dye to any automobile that strikes them, thus making it easier to catch and convict any motorist who strikes the telescoping devices.

BRIEF DESCRIPTION OF THE DRAWINGS

FIG. 5 is a front end view of a school bus incorporating my telescopic sign.

FIG. 7 is a side view of a bracket for holding paint and/or dye.

FIG. 8 is a front view of the bracket of FIG. 7.

FIG. 9 shows the bracket of FIG. 7 complete with the paint and/or dye container.

Figure 3:
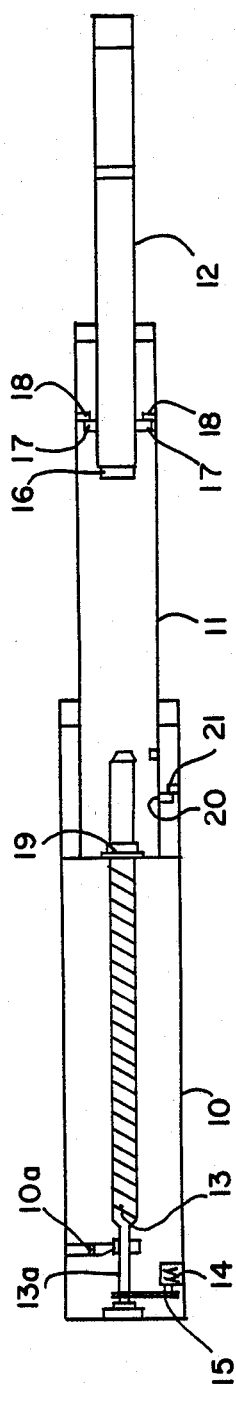
FIG. 3 is a cross-sectional view of my telescoping sign and its fully extended position.
Figure 2:
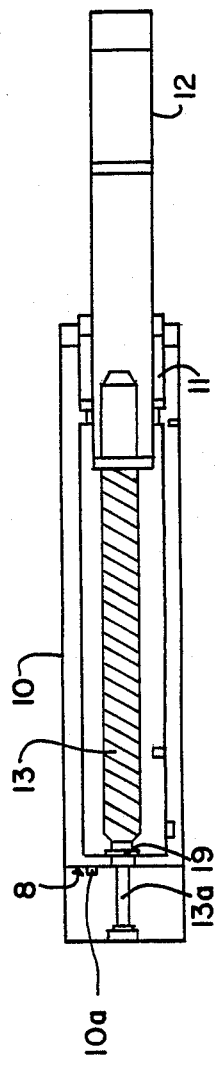
FIG. 2 is a cross-sectional view of my telescoping sign in a partially collapsed position.

The telescopic sign comprises three cylindrical elements 10, 11 and 12. The cylindrical elements 11 and 12 are driven into their extended and collapsed positions by a lead screw 13. The lead screw 13 is driven by motor 14 via a chain or belt 15. Since the direction of rotation of the motor 14 may be reversed the lead screw 13 may be rotated either clockwise or counterclockwise at the will of the operator as more fully discussed hereinafter in connection with FIG. 6. The motor 14 and the chain or belt 15 are shown only in FIG. 3 but they are equally present in FIGS. 1 and 2.

Figure 1:
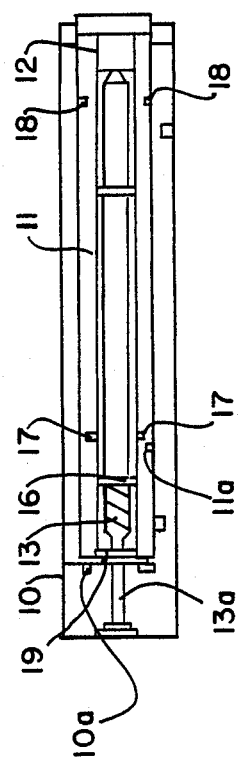
FIG. 1 is a cross-sectional view of my telescoping sign in collapsed position.

Referring to FIG. 1, when the lead screw 13 is rotated clockwise (viewed from the left) the internal threads of threaded socket 16 on the left end of the cylindrical element 12 causes the cylindrical element to move from its collapsed position as shown in FIG. 1, toward the right until outwardly projecting pins 17 (projecting outwardly from cylindrical element 12) engage pins 18 which project inwardly from cylindrical element 11. Cylindrical element 12 is restrained from rotation as explained in connection with FIG. 4. When the pins 17 engage pins 18 the outer cylindrical element carries the middle cylindrical element 11 from its normally inactive position toward the helical threads of the lead screw 13 so that the threads on the lead screw 13 mate with the internal threads of the socket 19 mounted on the left end of cylindrical element 11. The continued clockwise rotation of lead screw 13 now drives cylindrical element 11 toward the right due to the mating action of the helical threads of lead screw 13 and the internal threads of socket 19. Cylindrical element 11 is restrained from rotation as explained during the discussion of FIG. 4. This motion of cylindrical element 11 toward the right carries cylindrical element 12 with it, until pin 20 which projects outward frorm cylindrical element 11 engages stationary pin 21 mounted on stationary cylindrical element 10. This stops the outward movement of cylindrical elements 11 and 12. At this point some slippage in the drive system allows the motor to run for a short period before it stops. The slippage may be in the connection between socket 19 and cylindrical element, or it may be in the belt 15, or in the connection between the shaft 13a of the lead screw 13 and the pulley or pinion on shaft 13a that is driven by the belt or chain 15. When pin 20 engages pin 21 it operates an electric circuit, which is part of FIG. 6, to stop the motor 14.

When it is desired to collapse the telescopic cylindrical elements 10, 11 and 12, the direction of rotation of motor 14 is reversed so that it drives lead screw 13 counterclockwise (as viewed from the left). The mating of the internal threads of socket 19 and the helical threads of the lead screw 13 now drives the cylindrical element to the left until the socket 19 actually passes to the left of, and therefore leaves, the helical threads of the lead screw 13. In the meanwhile the socket 16 of the cylindrical element 12 has moved to the left until its internal threads have mated with the helical threads of the lead screw 13 so that cylindrical element 12 is driven to the left until its pin 17 strikes pin 11a and thereby pushes cylindrical element 11 a short further distance to the left. The cylindrical element 11 is now in its inactive position. Such movement to its inactive position operates an electrical switch 10a, which may operate switch 41 (FIG. 6) causing the motor 14 to stop. The apparatus has thus been restored to the position of FIG. 1.

It is a major feature of my invention that a telescopic arrangement such as the one described above may be added to a school bus as shown in FIG. 5. The school bus 30 has my cylindrical element 10 mounted on the front of the bus with cylindrical elements, when extended, projecting to one side of the bus. In the United States and other countries where the bus runs on the right side of the road, the cylindrical elements 11 and 12 would project from the left side (as viewed from the driver's seat) of the bus. A similar telescopic arrangement could also project from the left side of the rear of the bus.

Figure 4:
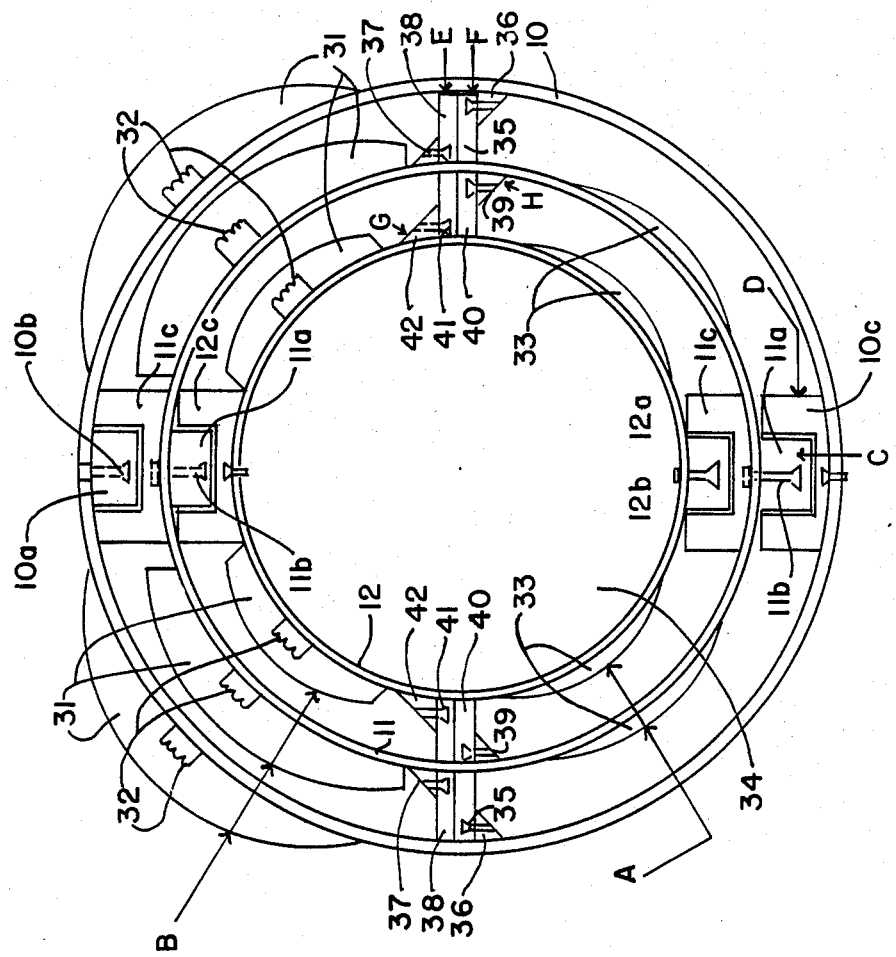
FIG. 4 is an end view showing the free end of my telescoping sign.

The several cylindrical elements 10, 11, and 12 have electric lights and/or other light producing or reflecting devices to warn oncoming cars to stop for the school bus. Thus, there may be such devices as flashing lights, reflecting pieces of glass, etc. mounted on the cylindrical element. These various warning devices are identified by reference number 31 on FIG. 5. In FIG. 4 the electric lights 31 have filaments 32. There may also be red dye markers 33 on the cylindrical elements 11 and 12. These may be as shown and described in conjunction with FIGS. 7, 8 and 9. A strobe light 34 may be mounted on the free end of cylindrical element 12 pointing outwardly along the longitudinal axis of the cylindrical elements 10, 11 and 12, to advise persons, on foot as well as those in cars on intersecting streets, of the bus.

FIG. 4 shows some of the details for mounting the cylindrical elements 11 and 12 and preventing their rotation. Horizontal plates 35 are connected by brackets 36 to the inner wall of cylindrical element 10. The middle cylindrical element 11 has brackets 37 on its outer walls for carrying flat plates 38. The middle cylinder 11 is carried by the flat plates 38 which slide across the top surfaces of flat plates 35. The cylindrical element 12 is similarly carried by cylindrical element 11. Brackets 39 mounted on cylindrical element 11 support flat plates 40 which support flat plates 41 which are attached to cylindrical element 12 by flanges 42.

To prevent sideplay, twisting and jackknifing, the several telescoping elements 10, 11 and 12 have guides. Guide 10a is attached to cylindrical element 10 by one or more bolts 10b, and slide in female guideway 11c attached to cylindrical element 11. Similarly, guide 11a attached to cylindrical element 11 by bolt 11b slides in guideway 12c attached to cylindrical element 12. Likewise, guide 12a is attached to cylindrical element 12 by bolt 12b, and slides in guideway 11c. Furthermore, guide 11a is attached to cylindrical element 11 by bolt 11b and slides in guideway 10c.

Figure 6:
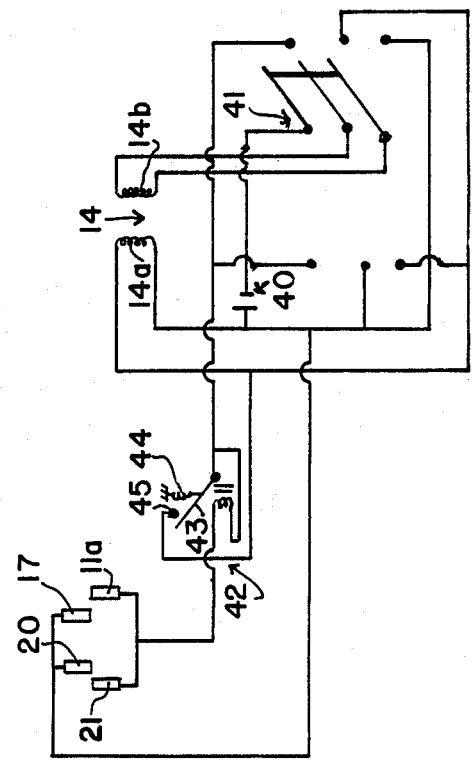
FIG. 6 is a schematic diagram of the electrical circuit for extending and collapsing the telescopic sign.

FIG. 6 shows the motor 14 as having a stator 14a and a rotor 14b. The main storage battery 40 for the bus is used as a power source. A three pole double throw switch 41 controls the operation of the motor 14. When the switch 41 is in its middle position as shown the apparatus is off. When the switch 41 is thrown to the right current from the battery 40 feeds the stator 14a and the rotor 14b when both of switches 17-11a and 20-21 are open. If switch 41 is thrown to the left the circuit is the same except that the relative direction of current flow between the stator 14a and the rotor 14b is reversed, thus reversing the direction of rotation of motor 14.

When either of switches 20-21 or 17-11a closes, the delay action relay 42 attracts armature 43 against the force of spring 44 and breaks the circuit between armature 43 and fixed contact 45 and opens the relay contacts 43, 45, thus breaking the circuit to the motor 14. The relay 42 is of a delay action type so that if switch 41 is thrown from one set of poles to the other set of poles the motor 14 will operate long enough to break the contacts 20-21 or 11a-17, as the case may be, therefore the relay 42 opens the circuit to the motor 14.

Therefore, the school bus operator may throw switch 41 to the right to energize the motor 14 to rotate lead screw 13 clockwise (viewed from the left of FIG. 1) to extend the telescopic cylindrical elements 11 and 12, thus signaling traffic to stop. When the school bus is ready to drive away, the switch 41 is thrown to the left to reverse the motor 14 and retract the cylindrical elements 11 and 12.

Suitable conventional flashing lighting circuits may be provided for lights 32.

When the bus driver has either retracted or extended the telescopic cylindrical elements 11 and 12 he may turn off the current and thus stop the drain on battery 40 by leaving switch 41 in its mid-position.

A switch 10a may be provided to automatically turn off the motor 14 when the cylinder 11 moves to its fully retracted position. The switch 10a, when cylinder 11 is fully retracted, may close a circuit to a solenoid that opens switch 41.

Various modifications are possible, and without any intent to limit the appended claims I will describe some modified forms.

Instead of just one telescoping device extending away from the left side of the bus, there may be a similar device extending from the right side of the bus.

A breakable container of paint or dye may be mounted on the members 11 and/or 12 so that if a motorist illegally passes the bus and strikes members 11 and 12 the container 73 for the paint or dye will break and spread the paint or dye on the car of the motorist attempting to pass the bus. FIG. 7 shows a side view of the mounting bracket 70 for the paint or dye container, and FIG. 8 shows a front view. The paint transfer surface 71 is intended to retain paint from any automobile that strikes the bracket 70. A colored distinctive dye 72 is located in a container 73 carried by bracket 70. The bracket 70 with its paint and dye may be mounted on members 11 and 12 so that any motorist driving into either of said members will have paint and/or dye spread upon his automobile. The paint and dye should be selected so that it will be hard for the motorist to remove. Therefore, he will stand little chance of escaping, but will be caught and convicted of illegally attempting to pass the school bus.

The main lead screw shaft may extend horizontally out of enclosure 10 and terminate in a short square rod so that a manual crank may turn the crank if the electrical system becomes inoperative.

I claim to have invented:
1. In a vehicle movable in a forward direction:
   elongated enclosure means extending horizontally across said vehicle for a substantial distance, said elongated enclosure means having a longitudinal axis transverse to said forward direction,
   a horizontal elongated member having a longitudinal axis coinciding with the first-named longitudinal axis, said member being located in said enclosure, and control means for moving said member along said axis until it projects away from said vehicle for an extended distance, said horizontal elongated member, comprising two members the first of which telescopes within the second, and including means which in response to said control means extends said members in series horizontally away from the vehicle.

2. In a vehicle as defined in claim 1 in which said horizontal elongated member is long enough and strong enough to do substantial damage to an automobile attempting to pass said vehicle.

3. In a vehicle as defined in claim 1:
light directing means mounted on said elongated member for directing light in a direction transverse to said axis.

4. In a vehicle as defined in claim 8, said light directing means comprising reflectors for reflecting light.

5. In a vehicle as defined in claim 3, said light directing means comprising a flashing red light for giving a warning to other vehicles.

6. In the vehicle of claim 1, said control means first extending said first member relative to the second member and then extending said second member which carries said first member with it to place the second and first members in series as they extend from the vehicle.

7. In a vehicle as defined in claim 6:
a flashing colored light mounted on each of said first and second members for providing warning signals to other vehicles.

8. In a vehicle as defined in claim 6:
said control means including a lead screw in said enclosure and extending along said axis for extending and retracting said first and second members,
each of said first and second members having an annular opening along said axis, said annular openings being defined by a wall having threads which mate with said lead screw whereby the lead screw may extend and retract said first and second members.

9. In a vehicle as defined in claim 8 including warning means on each of said first and second members for giving a warning signal to other vehicles.

10. In a vehicle as defined in claim 8:
said second member, when retracted, carrying its said annular opening off of said lead screw to a normally retracted position,
said first member including means for engaging the second member and moving said annular opening into a mating relation with said lead screw after the first member has been extended by said lead screw for a substantial distance.

11. In a vehicle as defined in claim 10:
said control means including a reversible electric motor for rotating said lead screw in first and second angular directions.

12. In a vehicle as defined in claim 10, warning means on said enclosure means and on each of said members for warning other vehicles.

13. In a vehicle having a side and capable of moving in a forward direction:
telescoping means comprising at least first, second and third members, said telescoping means including means for extending at least two of the first, second and third members in a series configuration extending away from said side of said vehicle,
control means for extending and retracting the telescopic means,
warning means on at least one of the said members which moves outwardly from the side of the vehicle when said telescoping means is extended.
said members being elongated along a common axis, and
said control means, including a lead screw extending along said common axis, for extending and retracting said members.

14. In a vehicle as defined in claim 13 in which the first and second of said members have sockets with internal threads that mate with said lead screw.

15. In a vehicle as defined in claim 14 in which said socket of said second member is off of the lead screw in the retracted position and when the members move to the extended position the first member moves a substantial distance at which time it engages the second member to move the socket of the second member onto the lead screw and thereafter the second member is moved by the lead screw away from said side carrying the first member with it.

16. In a vehicle having a side and capable of moving in a forward direction:
telescoping means comprising at least first, second and third members in a series configuration extending away from said side of said vehicle,
control means for extending and retracting the telescopic means, and
warning means for extending and retracting the telescopic means, and
warning means on at least one of the said members which moves outwardly from the side of the vehicle when said telescoping means is extended,
said telescoping means being long enough and strong enough to do substantial damage to an automobile attempting to pass said vehicle.

17. In a vehicle, having a front end, a rear end and two sides,
means for projecting a member away from one of said sides of the vehicle and into a lane of traffic that is parallel to the lane in which the vehicle is traveling, and
means on said member for applying a distinctively colored fluid to a car striking said member to thereby identify such car.

18. In a vehicle as defined in claim 17:
a breakable container on said member for normally holding said material.

19. In a bus movable in a forward direction and having a front end, a rear end and two sides that are in parallel planes,
an elongated element having a longitudinal axis that is substantially perpendicular to the plane of one of said sides, and
means for advancing said element along said axis so that said element extends away from said bus, for blocking traffic in a lane of traffic parallel to the lane in which said bus is traveling,
said elongated element comprising means for doing substantial damage to a car in said parallel lane that collides with said elongated element.

20. In a bus as defined in claim 19:
a fluid which will apply a distinctive color to a car to which the fluid is applied,
breakable means on said elongated element and containing said fluid for applying said fluid to a car that collides with said elongated element.

* * * * *

UNITED STATES PATENT AND TRADEMARK OFFICE
CERTIFICATE OF CORRECTION

PATENT NO. : 4,825,192

DATED : April 25, 1989

INVENTOR(S) : Kenneth A. Wells

It is certified that error appears in the above-identified patent and that said Letters Patent is hereby corrected as shown below:

In claim 16 (column 6, lines 29 and 30), delete:

warning means for extending and retracting the telescopic means, and

Signed and Sealed this

Thirteenth Day of November, 1990

Attest:

HARRY F. MANBECK, JR.

*Attesting Officer*  *Commissioner of Patents and Trademarks*